US009430574B2

(12) United States Patent
Zhang et al.

(10) Patent No.: US 9,430,574 B2
(45) Date of Patent: *Aug. 30, 2016

(54) DISPLAY FOR A NUMBER OF UNIQUE VALUES FOR AN EVENT FIELD

(71) Applicant: Splunk Inc., San Francisco, CA (US)

(72) Inventors: Steve Yu Zhang, San Francisco, CA (US); Stephen Phillip Sorkin, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/815,978

(22) Filed: Aug. 1, 2015

(65) Prior Publication Data

US 2015/0347526 A1    Dec. 3, 2015

Related U.S. Application Data

(63) Continuation of application No. 14/530,680, filed on Oct. 31, 2014, now Pat. No. 9,129,028, which is a continuation of application No. 14/158,421, filed on Jan. 17, 2014, now Pat. No. 8,990,245, which is a (Continued)

(51) Int. Cl.
| | |
|---|---|
| *G06F 17/30* | (2006.01) |
| *H04L 12/24* | (2006.01) |
| *H04L 29/08* | (2006.01) |

(52) U.S. Cl.
CPC ..... *G06F 17/30867* (2013.01); *G06F 17/3053* (2013.01); *G06F 17/30194* (2013.01);
(Continued)

(58) Field of Classification Search
CPC ............ G06F 17/30106; G06F 17/3051; G06F 17/30545; G06F 17/3053; G06F 17/30477; G06F 17/30486; G06F 17/30973; G06F 17/30991; G06F 17/30554; G06F 17/30353; G06F 17/30386; G06F 17/30551; G05B 23/0272; H04L 41/22; H04L 41/0604

USPC ........................................................ 707/725
See application file for complete search history.

(56) References Cited

U.S. PATENT DOCUMENTS

| 4,625,081 A | 11/1986 | Lotito et al. |
|---|---|---|
| 6,842,753 B2 | 1/2005 | Chaudhuri et al. |

(Continued)

FOREIGN PATENT DOCUMENTS

| WO | WO2007014268 | 2/2007 |
|---|---|---|
| WO | WO 2008/043082 | 4/2008 |

OTHER PUBLICATIONS

Korean Intellectual Property Office, International Preliminary Report on Patentability for PCT Application No. PCT/US2012/028922, dated Sep. 26, 2013, 4 pages.

(Continued)

*Primary Examiner* — Thanh-Ha Dang
(74) *Attorney, Agent, or Firm* — Wong & Rees LLP; Kirk D. Wong

(57) ABSTRACT

A method, system, and processor-readable storage medium are directed towards generating a report derived from data, such as event data, stored on a plurality of distributed nodes. In one embodiment the analysis is generated using a "divide and conquer" algorithm, such that each distributed node analyzes locally stored event data while an aggregating node combines these analysis results to generate the report. In one embodiment, each distributed node also transmits a list of event data references associated with the analysis result to the aggregating node. The aggregating node may then generate a global ordered list of data references based on the list of event data references received from each distributed node. Subsequently, in response to a user selection of a range of global event data, the report may dynamically retrieve event data from one or more distributed nodes for display according to the global order.

30 Claims, 6 Drawing Sheets

Related U.S. Application Data continuation of application No. 13/660,845, filed on Oct. 25, 2012, now Pat. No. 8,751,529, which is a continuation of application No. 13/223,167, filed on Aug. 31, 2011, now abandoned.

(60) Provisional application No. 61/452,591, filed on Mar. 14, 2011.

(52) U.S. Cl.
CPC ... *G06F17/30312* (2013.01); *G06F 17/30353* (2013.01); *G06F 17/30386* (2013.01); *G06F 17/30477* (2013.01); *G06F 17/30486* (2013.01); *G06F 17/30545* (2013.01); *G06F 17/30551* (2013.01); *G06F 17/30554* (2013.01); *G06F 17/30864* (2013.01); *G06F 17/30973* (2013.01); *G06F 17/30991* (2013.01); *H04L 41/0604* (2013.01); *H04L 41/22* (2013.01); *H04L 67/1097* (2013.01)

(56) References Cited

U.S. PATENT DOCUMENTS

| | | | |
|---|---|---|---|
| 6,920,468 | B1 | 7/2005 | Cousins et al. |
| 6,985,944 | B2 | 1/2006 | Aggarwal |
| 7,020,696 | B1 | 3/2006 | Perry et al. |
| 7,076,613 | B2 | 7/2006 | Peir et al. |
| 7,143,153 | B1 | 11/2006 | Black et al. |
| 7,185,087 | B2 | 2/2007 | Gourraud |
| 7,200,671 | B1 | 4/2007 | Lev-Ami et al. |
| 7,358,085 | B2 | 4/2008 | Zhang et al. |
| 7,451,224 | B1 | 11/2008 | Stamler |
| 7,464,077 | B1 | 12/2008 | Baunach et al. |
| 7,475,964 | B2 | 1/2009 | Benson et al. |
| 7,484,097 | B2 | 1/2009 | Steiger et al. |
| 7,499,958 | B1 | 3/2009 | Ionescu |
| 7,506,195 | B2 | 3/2009 | Takahashi et al. |
| 7,558,823 | B2 | 7/2009 | Beers et al. |
| 7,581,227 | B1 | 8/2009 | Lawrence et al. |
| 7,650,638 | B1 | 1/2010 | Njemanze et al. |
| 7,693,687 | B2 | 4/2010 | Lev-Ami et al. |
| 7,732,196 | B2 | 6/2010 | Zhang et al. |
| 7,795,209 | B2 | 9/2010 | Zhang et al. |
| 7,893,022 | B2 | 2/2011 | Zhang et al. |
| 7,966,305 | B2 | 6/2011 | Olsen |
| 8,012,946 | B1 | 9/2011 | Zhang et al. |
| 8,112,425 | B2 | 2/2012 | Baum et al. |
| 8,164,419 | B2 | 4/2012 | Fisher |
| 8,380,530 | B2 * | 2/2013 | Marshall ............... 705/2 |
| 8,751,529 | B2 | 6/2014 | Zhang et al. |
| 8,990,245 | B2 | 3/2015 | Zhang et al. |
| 8,994,311 | B1 * | 3/2015 | Lynch ............ G06F 17/3082 318/565 |
| 9,129,028 | B2 | 9/2015 | Zhang et al. |
| 2002/0083168 | A1 | 6/2002 | Sweeney et al. |
| 2003/0052939 | A1 | 3/2003 | Farr et al. |
| 2004/0022444 | A1 | 2/2004 | Rhoads |
| 2004/0088405 | A1 * | 5/2004 | Aggarwal ......... H04L 41/069 709/224 |
| 2005/0114508 | A1 | 5/2005 | DeStefano |
| 2005/0172162 | A1 * | 8/2005 | Takahashi ......... G06F 11/0709 714/4.4 |
| 2006/0027937 | A1 | 2/2006 | Benson et al. |
| 2006/0079475 | A1 | 4/2006 | Zhang et al. |
| 2006/0101101 | A1 * | 5/2006 | Pandit ................... G06F 21/552 |
| 2006/0210539 | A1 | 9/2006 | Zhang et al. |
| 2006/0277282 | A1 | 12/2006 | Christensen et al. |
| 2006/0287766 | A1 | 12/2006 | Kraft |
| 2007/0055555 | A1 | 3/2007 | Baggett et al. |
| 2007/0118491 | A1 | 5/2007 | Baum et al. |
| 2007/0233710 | A1 * | 10/2007 | Passey ..................... G06F 9/542 |
| 2007/0282994 | A1 | 12/2007 | Beers et al. |
| 2008/0104542 | A1 * | 5/2008 | Cohen ............... G06F 17/30864 715/810 |
| 2008/0108556 | A1 | 5/2008 | Zhang et al. |
| 2008/0118469 | A1 | 5/2008 | Zhang et al. |
| 2008/0187523 | A1 | 8/2008 | Zhang et al. |
| 2009/0089252 | A1 * | 4/2009 | Galitsky ........... G06F 17/30637 |
| 2009/0215878 | A1 | 8/2009 | Tan et al. |
| 2009/0319956 | A1 * | 12/2009 | Emard ............... G06F 17/30994 715/854 |
| 2010/0042590 | A1 | 2/2010 | Smyros et al. |
| 2010/0118895 | A1 | 5/2010 | Radulescu |
| 2011/0078597 | A1 * | 3/2011 | Rapp ................... G06F 3/04845 715/765 |
| 2011/0082078 | A1 | 4/2011 | Dent et al. |
| 2011/0082093 | A1 | 4/2011 | Gregory et al. |
| 2011/0099500 | A1 * | 4/2011 | Smith .................... G06F 3/0482 715/771 |
| 2011/0153643 | A1 * | 6/2011 | Haggie .................. G06Q 10/06 707/769 |
| 2011/0178836 | A1 | 7/2011 | Seefeld et al. |
| 2011/0191711 | A1 * | 8/2011 | Gill ........................ G06Q 10/20 715/780 |
| 2012/0054246 | A1 | 3/2012 | Fischer |
| 2012/0158783 | A1 | 6/2012 | Nice et al. |
| 2012/0190299 | A1 | 7/2012 | Takatsuka et al. |
| 2012/0197928 | A1 | 8/2012 | Zhang et al. |
| 2012/0197934 | A1 | 8/2012 | Zhang et al. |
| 2013/0007847 | A1 * | 1/2013 | Plattner ................... G06Q 10/08 726/4 |
| 2013/0031613 | A1 | 1/2013 | Shanabrook et al. |
| 2013/0046783 | A1 | 2/2013 | Zhang et al. |
| 2013/0073542 | A1 | 3/2013 | Zhang et al. |
| 2014/0136529 | A1 | 5/2014 | Zhang et al. |
| 2014/0317111 | A1 | 10/2014 | Zhang et al. |
| 2015/0058325 | A1 | 2/2015 | Zhang et al. |
| 2015/0058326 | A1 | 2/2015 | Zhang et al. |
| 2015/0058375 | A1 | 2/2015 | Zhang et al. |

OTHER PUBLICATIONS

Korean Intellectual Property Office, International Search Report and Written Opinion in Application No. PCT/2012/028922, dated Aug. 28, 2012, 2 pages.

Nisheeth Shrivastava, "Medians and Beyond: New Aggregation Techniques for Sensor Networks", dated Nov. 3-5, 2004, SenSys '04, pp. 1-11.

Nisheeth Shrivastava, Medians and Beyond: New Aggregation Techniques for Sensor Networks:, Nov. 3-5, dated 2004, SenSys, '04, 11 pp.

World Intellectual Property Organization, Application No. PCT/US2012/028922, "Preliminary Report on Patentability" dated Sep. 17, 2013, 5 pages.

World Intellectual Property Organization, Application No. PCT/US2012/028922, "Search Report and Written Opinion" dated Aug. 28, 2012, 7 pages.

United States Patent and Trademark Office, U.S. Appl. No. 14/266,838, Notice of Allowance dated Oct. 26, 2015.

\* cited by examiner

DISPLAY FOR A NUMBER OF UNIQUE VALUES FOR AN EVENT FIELD

CROSS-REFERENCE TO RELATED APPLICATIONS

This application claims benefit as a Continuation of Ser. No. 14/530,680, filed Oct. 31, 2014, which claims benefit as a Continuation of Ser. No. 14/158,421, filed Jan. 17, 2014, now U.S. Pat. No. 8,990,245, which claims benefit as a Continuation of Ser. No. 13/660,845, filed Oct. 25, 2012, now U.S. Pat. No. 8,751,529, which claims benefit as a Continuation of Ser. No. 13/223,167, filed on Aug. 31, 2011, which claims benefit of Provisional Patent Application Ser. No. 61/452,591 filed on Mar. 14, 2011, the entire contents of the aforementioned are hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates generally to generating reports and more particularly but not exclusively to reducing latency when generating interactive reports from data contained on a plurality of distributed computing nodes.

BACKGROUND

An increasing number of computing applications, particularly within the enterprise, entail analyzing distributed data. One type of analysis is report generation, such as generating a table, a chart, or a timeline from distributed data. Some reports are generated by copying all of the data from the plurality of distributed nodes to a single aggregating node for analysis. However, if the amount of data to be analyzed is large, then transmitting this data over a network can be prohibitively time consuming. Also, a single aggregating node may not contain the capacity necessary to store data received from a plurality of distributed nodes. Accordingly, efficiently generating reports that contain aggregate information as well as raw data is an ongoing challenge.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the described embodiments, reference will be made to the following Detailed Description, which is to be read in association with the accompanying drawings, wherein.

DETAILED DESCRIPTION OF THE INVENTION

Figure 1:
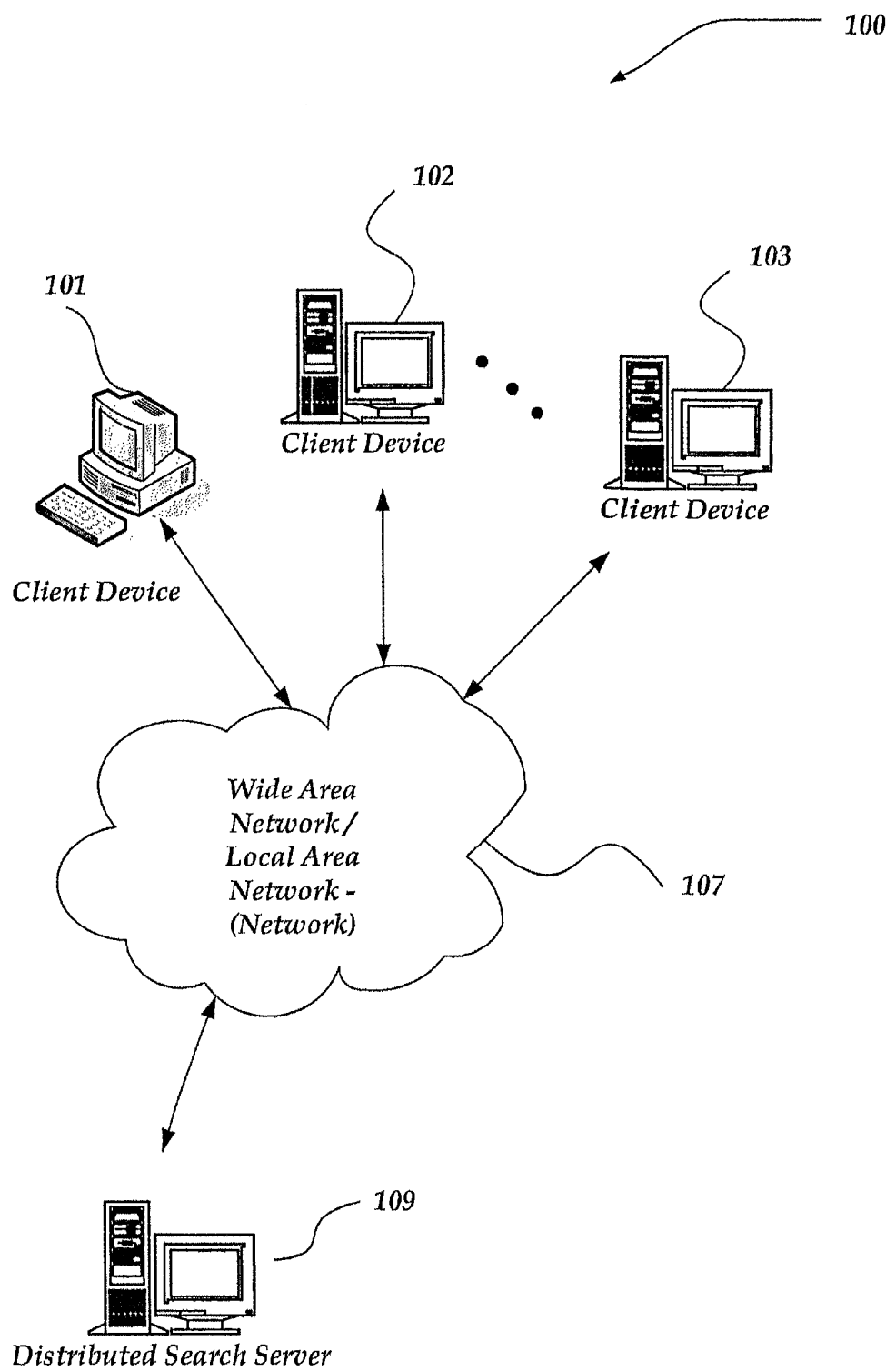
FIG. 1 illustrates a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "event data" refers to computing data that is collected about a computing system, including, for example, an action, characteristic, condition (or state), or state change of the computing system. For example, such events may be about a computing system's performance, actions taken by the computing system, or the like. Event data may be obtained from various computing log files generated by the computer's operating system, and/or other monitoring application. However, event data is not restricted by a file format or structure from which the event data is obtained.

As used herein, an event record refers to data associated with a single event.

As used herein, the term "report" refers to one or more visualizations of search query results. For example, a report may include a table of data, a timeline, a chart, a "field picker" or the like. In one embodiment, the report is interactive, enabling a user to selectively view pieces of raw data used to generate the report. For example, if the report lists users sorted based on the number of times each user has logged into the system, each user is selectable to view detailed records of that user's login events.

Briefly described is a mechanism for generating a report derived from data, such as event data, stored on a plurality of distributed nodes. In one embodiment the analysis is generated using a "divide and conquer" algorithm, such that each distributed node analyzes locally stored event data while an aggregating node combines these analysis results to generate the report. In one embodiment, each distributed node also transmits a list of event data references associated with the analysis result to the aggregating node. The aggregating node may then generate a global ordered list of data references based on the list of event data references received from each distributed node. Subsequently, in response to a user selection of a range of global event data, the report may dynamically retrieve event data from one or more distributed nodes for display according to the global order.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 107, client devices 101-103, and distributed search server 109.

One embodiment of client devices 101-103 is described in more detail below in conjunction with FIG. 2. Generally, however, client devices 101-103 may include virtually any computing device capable of communicating over a network to send and receive information, including a search query, analysis results of a search query, lists of event data references, collections of event data, and the like. Client devices 101-103 are referred to interchangeably herein as "distributed computing devices", "distributed nodes", or the like. In one embodiment, one or more of client devices 101-103 may be configured to operate within a business or other entity to perform a variety of services for the business or other entity. For example, client devices 101-103 may be configured to operate as a web server, an accounting server, a production server, an inventory server, or the like. However, client devices 101-103 are not constrained to these services and may also be employed, for example, as an end-user computing node, in other embodiments. Further, it should be recognized that more or less client devices may be included within a system such as described herein, and embodiments are therefore not constrained by the number or type of client devices employed.

The set of such client devices 101-103 may include devices that typically connect using a wired or wireless communications medium such as personal computers, servers, multiprocessor systems, microprocessor-based or programmable consumer electronics, network PCs, or the like. In one embodiment, at least some of client devices 101-103 may operate over wired and/or wireless network. In some embodiments, client devices 101-103 may include virtually any portable computing device capable of receiving and sending a message over a network, such as network 107.

Client devices 101-103 also may include at least one client application that is configured to capture and record event data and/or related metadata. However, the client application need not be limited to merely providing event data and related metadata, and may also provide other information, and/or provide for a variety of other services, including, for example, monitoring for events within and/or between client devices.

The client application may further provide information that identifies itself, including a type, capability, name, and the like. Such information may be provided in a network packet, or the like, sent between other client devices, distributed search server 109, or other computing devices.

Network 107 is configured to couple network devices with other computing devices, including distributed search server 109 and client devices 101-103. Network 107 is enabled to employ any form of computer readable media for communicating information from one electronic device to another. Also, network 107 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, Digital Signal (DS)-0, DS-1, DS-2, DS-3, DS-4, Optical Carrier (OC)-3, OC-12, OC-48, or the like. Furthermore, remote computers and other related electronic devices could be remotely connected to either LANs or WANs via a modem and temporary telephone link. In one embodiment, network 107 may be configured to transport information of an Internet Protocol (IP). In essence, network 107 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, Radio Frequency (RF), infrared, and other wireless media.

In some embodiments, network 107 may be further configurable as a wireless network, which may further employ a plurality of access technologies including 2nd (2G), 3rd (3G), 4th (4G) generation radio access for cellular systems, WLAN, Wireless Router (WR) mesh, and the like. In one non-limiting example, network 107, when configured as a wireless network, may enable a radio connection through a radio network access such as Global System for Mobile communication (GSM), General Packet Radio Services (GPRS), Enhanced Data GSM Environment (EDGE), Wideband Code Division Multiple Access (WCDMA), and the like.

Distributed search server 109 includes virtually any network device usable to receive a search query, distribute sub-queries of the search query among client devices 101-103, synthesize the results of the sub-queries, and display a report. Distributed search server 109 may, for example, be configured to merge lists of event data references into a global ordered list of event data references, enabling ranges of event data to be selectively retrieved from one or more distributed nodes.

Devices that may operate as distributed search server 109 include various network devices, including, but not limited to personal computers, desktop computers, multiprocessor systems, microprocessor-based or programmable consumer electronics, network PCs, server devices, network appliances, and the like.

Although FIG. 1 illustrates distributed search server 109 as a single computing device, the invention is not so limited. For example, one or more functions of the distributed search server 109 may be distributed across one or more distinct network devices. Moreover, distributed search server 109 is not limited to a particular configuration. Thus, in one embodiment, distributed search server 109 may contain a plurality of network devices to perform digest aggregation and calculation of approximate order statistics therefrom. Similarly, in another embodiment, distributed search server 109 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
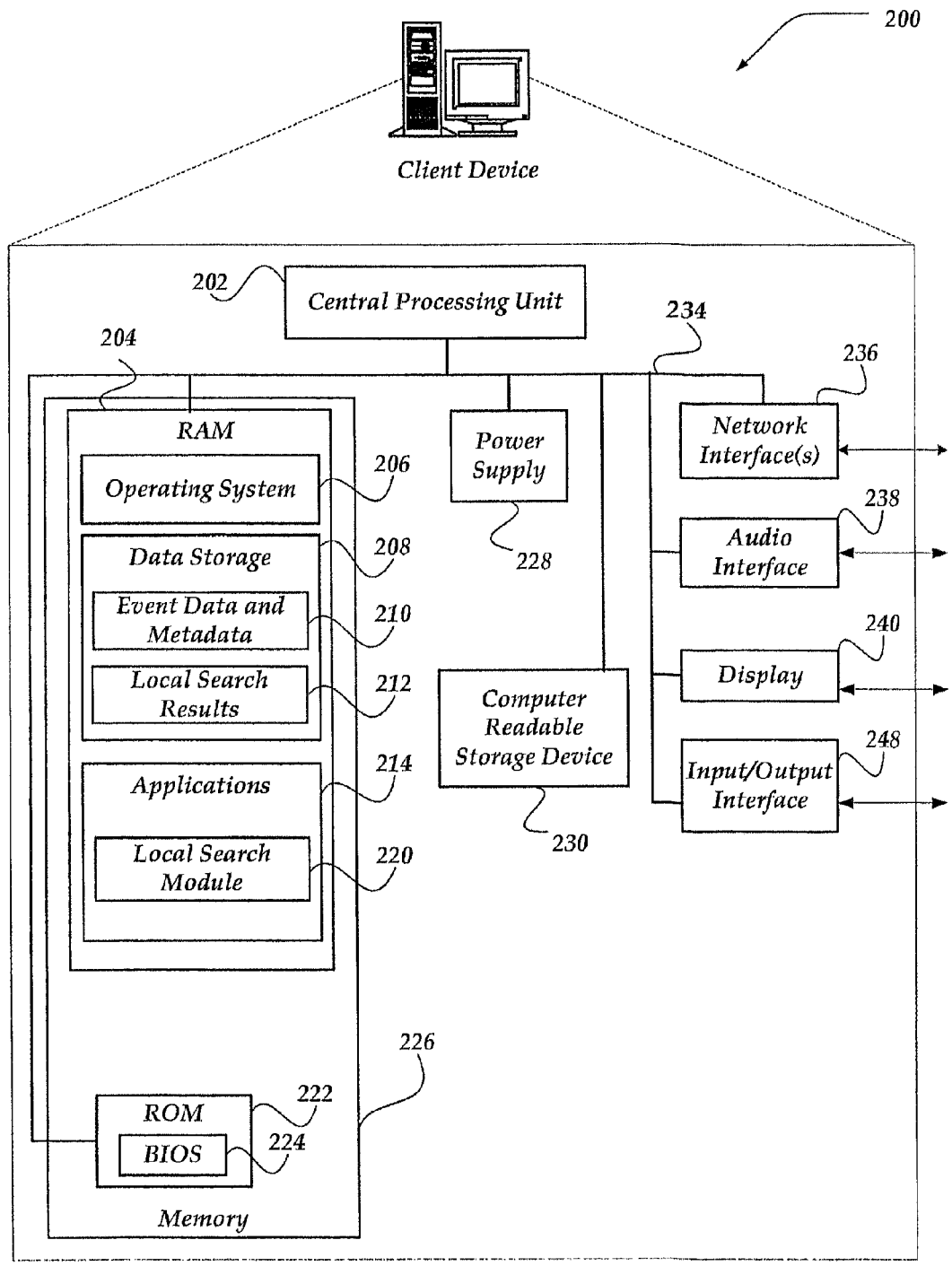
FIG. 2 illustrates an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-103 of FIG. 1.

As shown in the figure, client device 200 includes processing unit (CPU) 202 in communication with a mass memory 226 via a bus 234. Client device 200 also includes a power supply 228, one or more network interfaces 236, an audio interface 238, a display 240, and an input/output interface 248. Power supply 228 provides power to client device 200.

Network interface 236 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), Short Message Service (SMS), general packet radio service (GPRS), Wireless Application Protocol (WAP), ultra wide band (UWB), Institute of Electrical and Electronics Engineers (IEEE) 802.16 Worldwide Interoperability for Microwave Access (WiMax), Session Initiation Protocol (SIP)/Real-time Transport Protocol (RTP), or any of a variety of other communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action. Display 240 may be a liquid crystal display (LCD), gas plasma, light emitting diode (LED), or any other type of display used with a computing device. Display 240 may also include a touch sensitive screen arranged to receive input from an object such as a stylus or a digit from a human hand.

Client device 200 also comprises input/output interface 248 for communicating with external devices, such as a keyboard, or other input or output devices not shown in FIG. 2. Input/output interface 248 can utilize one or more communication technologies, such as USB, infrared, Bluetooth™, or the like.

Mass memory 226 includes a Random Access Memory (RAM) 204, a Read Only Memory (ROM) 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. At least a portion of the information may also be stored on a disk drive or other computer-readable storage device 230 within client device 200. Data storage 208 may further store event data and metadata 210 and local search results 212. Such event data and metadata 210 and local search results 212 may also be stored within any of a variety of other computer-readable storage devices, including, but not limited to a hard drive, a portable storage device, or the like, such as illustrated by computer-readable storage device 230.

Applications 214 may include computer executable instructions which, when executed by client device 200, transmit, receive, and/or otherwise process network data. Other examples of application programs include calendars, search programs, email clients, IM applications, SMS applications, Voice Over IP (VOIP) applications, contact managers, task managers, transcoders, database programs, word processing programs, security applications, spreadsheet programs, games, search programs, data log recording programs, and so forth. Applications 214 may include, for example, local search module 220. Local search module 220 may process a sub-query, returning analysis results and a list of event data references associated with the analysis results, as described herein.

Illustrative Network Device

Figure 3:
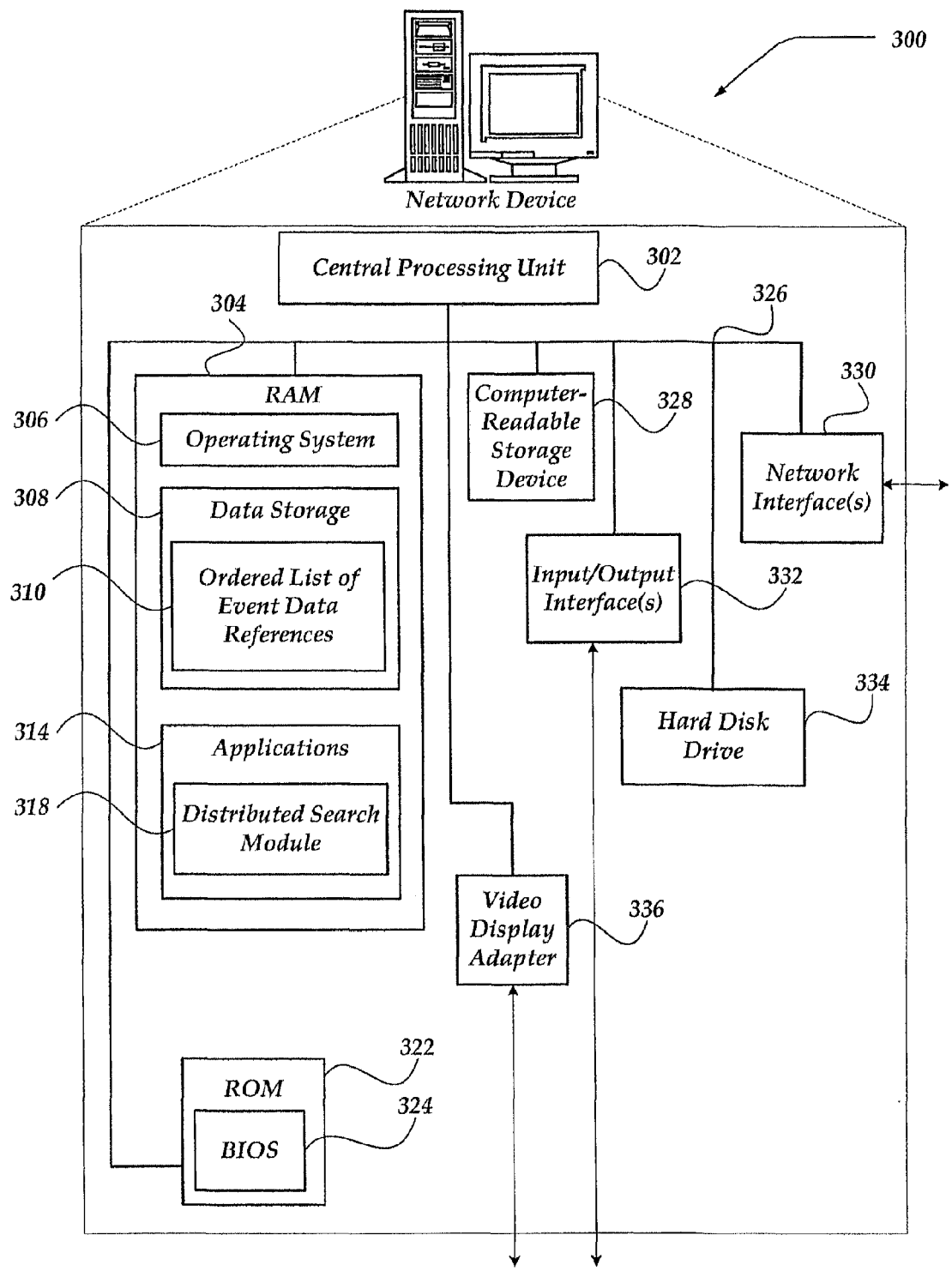
FIG. 3 illustrates an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, or any other device. Network device 300 may represent, for example distributed search server 109 of FIG. 1.

Network device 300 includes processing unit 302, an input/output interface 332, video display adapter 336, and a mass memory, all in communication with each other via bus 326. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network device 300. Any general-purpose operating system may be employed. Basic input/output system ("BIOS") 324 is also provided for controlling the low-level operation of network device 300. As illustrated in FIG. 3, network device 300 also can communicate with the Internet, or some other communications network, via network interface unit 330, which is constructed for use with various communication protocols including the Transmission Control Protocol/Internet Protocol (TCP/IP) protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG.

3. Input/output interface 332 can utilize one or more communication technologies, such as USB, infrared, Bluetooth™, or the like.

The mass memory as described above illustrates another type of computer-readable media, namely computer-readable storage media and/or processor-readable storage medium. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, Compact Disc ROM (CD-ROM), digital versatile disks (DVD) or other optical storage, magnetic cassettes, magnetic tape, magnetic disk storage or other magnetic storage devices, or any other non-transitory physical medium which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses; or the like. Data stores 308 may further include program code, data, algorithms, and the like, for use by a processor, such as central processing unit (CPU) 302 to execute and perform actions. In one embodiment, at least some of data store 308 might also be stored on another component of network device 300, including, but not limited to computer-readable storage medium 328, hard disk drive 334, or the like. Data storage 308 may further store ordered list of event data references 310.

Ordered list of event data references 310 may include a list of event data references received from a plurality of distributed nodes. In one embodiment, the ordered list of event data references is generated by sorting data references received from each distributed node according to a common field, such as a timestamp, a number a string, or the like. In one embodiment, each element of the ordered list includes a reference to the distributed node the event data is stored on, an offset or other pointer to the event data on that distributed node, and optionally the value used to sort the ordered list.

The mass memory also stores program code and data. One or more applications 314 are loaded into mass memory and run on operating system 306. Examples of application programs may include transcoders, schedulers, calendars, database programs, word processing programs, Hyper Text Transfer Protocol (HTTP) programs, customizable user interface programs, Internet Protocol Security (IPSec) applications, encryption programs, security programs, SMS message servers, account managers, and so forth. Distributed search module 318 may also be included as application programs within applications 314.

Distributed search module 318 may be configured and arranged to receive a query, generate sub-queries for each of a specified set of distributed devices, and aggregate results of these sub-queries to generate a report, as described further herein.

Generalized Operation

Figure 4:
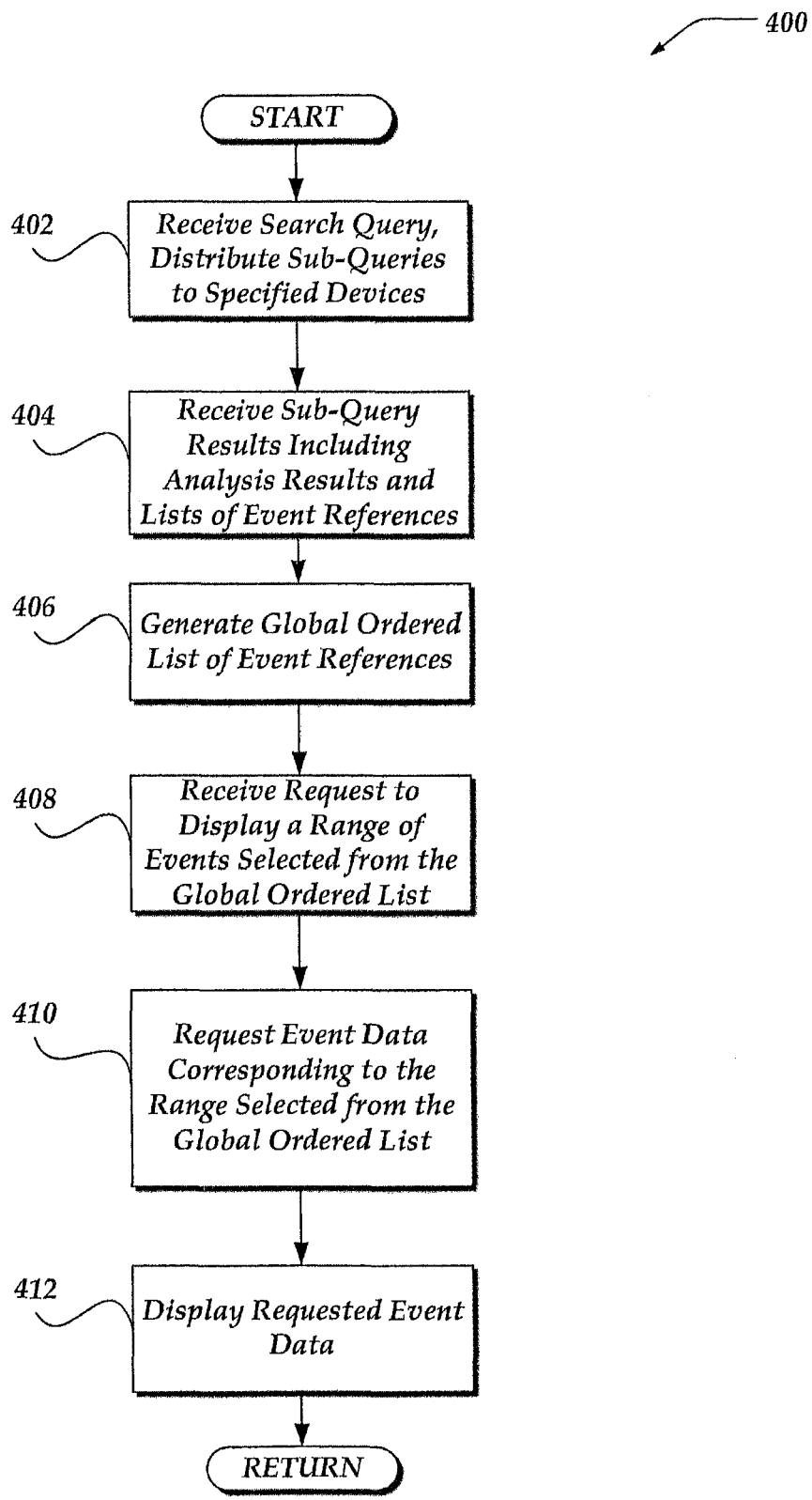
FIG. 4 illustrates a logical flow diagram showing one embodiment of a process for generating and displaying an interactive report.
Figure 5:
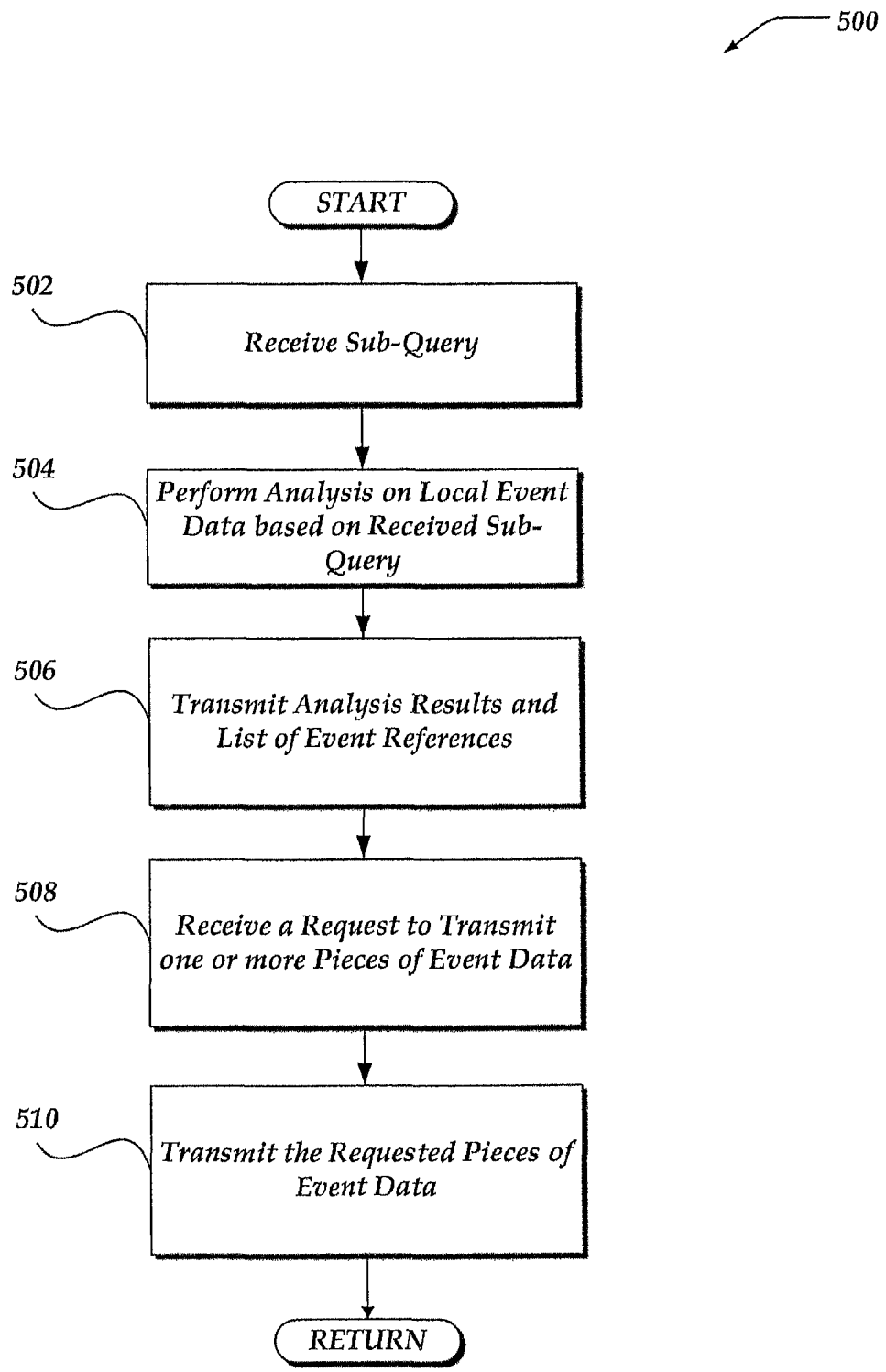
FIG. 5 illustrates a logical flow diagram showing one embodiment of a process for analyzing raw data on a distributed node for display in an interactive report.
Figure 6:
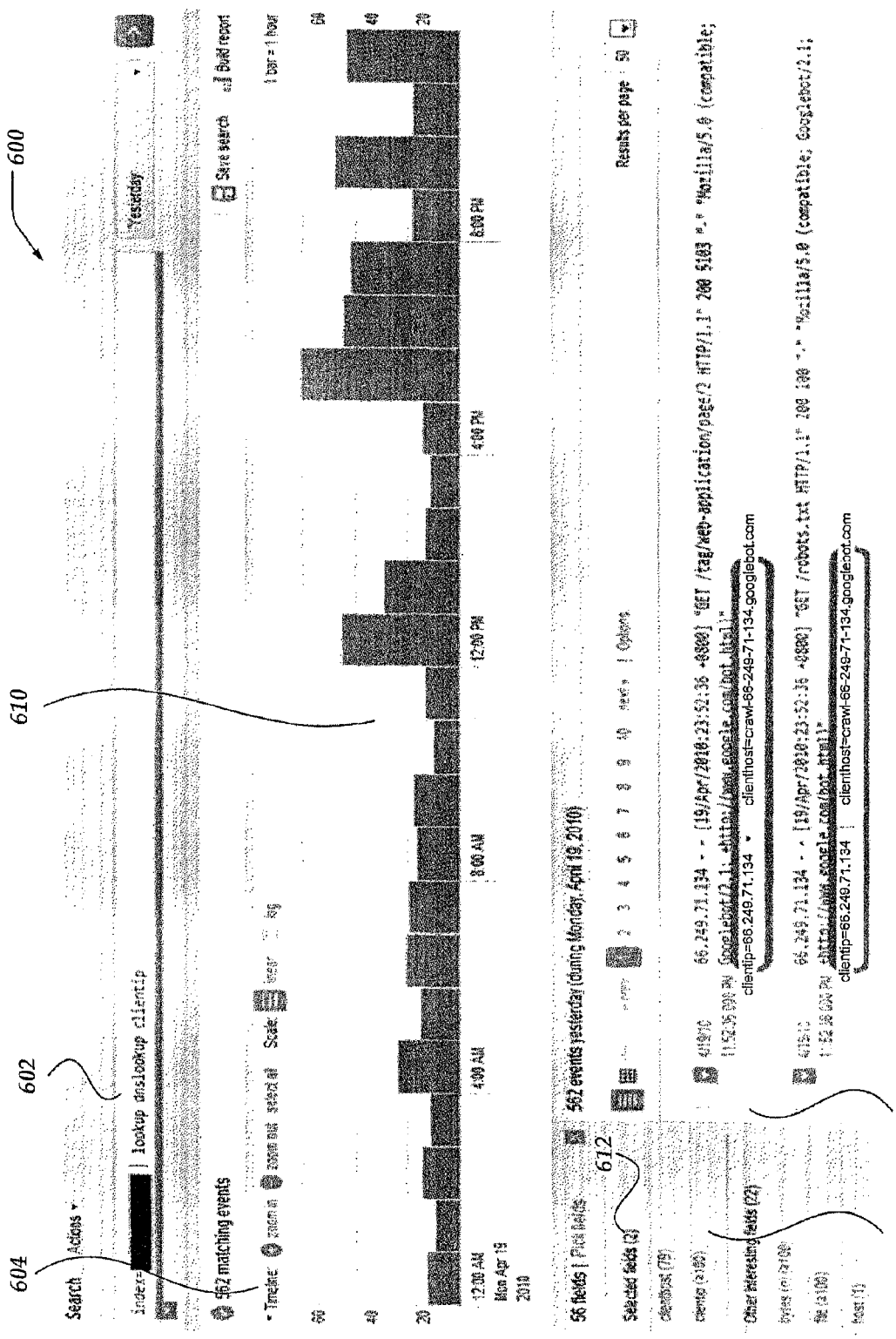
FIG. 6 illustrates one non-limiting embodiment of an interactive report.

The operation of certain aspects will now be described with respect to FIGS. 4-6. FIGS. 4-5 provide logical flow diagrams illustrating certain aspects, while FIG. 6 illustrates an example of a scalable interactive display of distributed data. FIG. 4 illustrates a logical flow diagram of one embodiment of a process for generating and displaying an interactive report. In one embodiment, process 400 may be implemented on distributed search server 109.

Process 400 begins, after a start block, at block 402, where a search query (hereinafter "query") is received. In one embodiment, the received query targets data, such as "event data" (also referred to as "events"), that is distributed across a plurality of specified computing devices, such as client devices 101-103. In one embodiment, sub-queries are generated for each of the specified computing devices and submitted to each corresponding computing device for processing. For example, if the received query asks for a count of system log entries that contain the word "error", then a sub-query is generated for each of the specified computing devices, where each sub-query counts the number of events derived from system log entries that contain the word "error" stored on that device.

The received query may specify which computing devices to search in a number of ways. In one embodiment, the received query specifies particular computing devices or groups of computing devices by name, network address, or the like. In another embodiment, computing devices are specified based on attributes, such as operating system, hardware components (e.g. CPU, web cam, network adapter, etc.), form factor (e.g. laptop, desktop, server, tablet, virtual machine, smartphone, etc.), and the like. In another embodiment, a query may specify all of the plurality of computing devices.

In one embodiment, the received query is received from a user, such as a system administrator. However, queries may also be automatically generated by a software agent. In one embodiment, a query may be automatically generated at periodic intervals, such as every hour or every Saturday night. In another embodiment, a query may be generated in response to an event, such as installation of a software patch, or in response to a metric crossing a threshold, such as an unusually large volume of network traffic.

The distributed data to be searched may be stored on the specified computing devices in many ways. In one embodiment, the distributed data may include events, as defined herein, that have been recorded and stored by each of the specified computing devices. However, the distributed data may be generated at any time and in any manner, including partitioning a data set across specified computing devices after the query has been received. Also, while in one embodiment the distributed data comprises "events" or "event data" as defined herein, the distributed data may include any kind of data, structured or unstructured.

The received query may include one or more analyses to be performed on the distributed event data by the computing devices storing that data. For example, an analysis may include counting the number of events that satisfy a condition, deriving statistical information about events (including distributions, histograms, $N^{th}$ percentile rankings, and the like), grouping events, sorting events, and the like. That is, the analysis may be performed in response to the query.

In one embodiment, the received query may also specify the order of query results. For example, a query requesting system log entries that contain the word "error" may be ordered based on the time the system log entry was generated (timestamp). A similar query may order entries based on an error severity value field in the event derived from the system log entry. Multiple orderings and nested orderings are also contemplated, such as ordering first by an error severity value and then by a timestamp.

The process proceeds to block 404, where sub-query results are received from each of the specified computing devices. In one embodiment, the sub-query results include analysis results corresponding to the one or more analyses specified in the received query. In one embodiment, analysis results are derived from raw event data stored on each of the specified devices, but analysis results do not include the actual raw event data.

The sub-query results additionally include one or more lists of event references. In one embodiment, each event reference includes (1) an identifier that uniquely identifies the event on the computing device that generated it, and (2) a value usable to order the event (hereinafter "order value"). In one embodiment the unique identifier includes a serial number assigned to the event as the event is created. In this example, the unique identifier is unique to a given computing device—events from different computing devices may be assigned the same unique identifier. However, globally unique identifiers, such as GUIDs, are similarly contemplated.

In one embodiment, the order value of an event may be a timestamp, such as the time when an event was created. However, any value of any data type is similarly contemplated. Other examples of order values include integers, such as a severity of error, and a string, such as a username.

In one embodiment, a computing device creates an event reference for each event used to generate an analysis result. For example, consider three devices A, B, and C that contain 14, 37, and 94 system log events containing the word, "error", respectively. If a query to count all of the system log events that contain the word "error" is received, device A will return a count of 14 as well as a list of 14 references, one reference for each of the 14 counted events. Similarly, device B will return a count of 37 as well as a list of 37 references, and device C will return a count of 94 and a list of 94 references. Note that at this time, none of the raw event data has been transmitted to the distributed search server.

The process proceeds to block 406, where a global ordered list of event references is generated based on each of the returned lists of event references. In one embodiment, each entry in the global ordered list includes the content of an event reference, as described above, as well as an identifier of the computing device that the event was found on.

Continuing the example above, consider if the first 7 of device A's events were the first to be recorded, followed by the first 50 of device C's, followed by all 37 of device B's, followed by the last 44 of device C, and finally the last 7 of device A. In this simple example, the global ordered list would include all 145 event references in this same order, where each event reference is fully qualified to include a computing device identifier in addition to that event's unique identifier. In this way, a user may select a range from the global ordered list of event references, and only the actual event data contained in the selected range is downloaded.

The process proceeds to block 408, where a request to display a range of events is received. Continuing the above example, the global ordered list includes 145 fully qualified event references. A request may be received to display the last 5 events, the second 50 events, the first event, all 145 of the events, or any other sub-range of the events.

The process proceeds to block 410, where event data is requested from one or more of the computing devices based on the range of event references requested from the global ordered list. For example, if the first 50 events are requested, then the first 50 entries in the global ordered list are retrieved. Continuing the example above, the first 7 events from device A would be requested, all 37 of the events from device B would be requested, and the first 6 events from device C would be requested. Thus a total of 50 events are retrieved from three different computing devices, without retrieving any unnecessary events. In one embodiment these requests are made in parallel, however requests may be submitted to individual devices serially. Also, in one embodiment, a range of events may be requested from a single computing device in a single network transaction, however requests may also be made individually.

The process proceeds to block 412, where the raw data is displayed. In one embodiment, event data retrieved from individual computing devices are displayed according to the global order. In one embodiment, the requested raw data is displayed with the one or more analysis results. In this way, a user may see the analysis results as well as portions of the underlying data. The process then proceeds to a return block.

FIG. 5 illustrates a logical flow diagram generally showing one embodiment of a process an individual computing device may perform in the course of performing a distributed search query. In one embodiment, process 500 is performed by one of client devices 101-103.

Process 500 begins, after a start block, at block 502, where a sub-query is received from a distributed search server. The process then proceeds to block 504, where data such as events are analyzed according to the received sub-query. In one embodiment, as events are analyzed, events that contribute to the requested analysis are referenced in a list of event references.

The process then proceeds to block 506, where the results of the analysis and the list of event references are transmitted to the computing device that submitted the sub-query. In one embodiment, this device is distributed search server 109.

The process then proceeds to block 508, where a request for one or more pieces of event data is received. In one embodiment, the request includes a contiguous range of event data. In another embodiment, individual pieces of event data are individually requested. The process then proceeds to block 510, where the requested pieces of event data are transmitted to the requestor. The process then proceeds to a return block.

FIG. 6 illustrates one non-limiting example of an interactive report 600; however, other layouts containing other types of information are similarly contemplated. The interactive report was generated based on a search query 602 of all domain name system (dns) lookups the specified clients performed "yesterday". The report is broken into three sections—a timeline 604, a field picker 606, and an event data view 608. The timeline includes a bar graph 610 depicting how many dns lookups were performed each hour. Field picker 606 is generally used to select fields 612 from all of the fields available on a given type of event. In this example, field picker 606 has been used to select two of the 24 fields associated with dns lookup events: client host and client IP. Thus, the event data displayed in the event data view will contain only these two fields. Finally, the event data view 608 displays raw event data, currently 50 results per page. A total of 562 events were gathered from 79 clients. However, only the first 50 events have been downloaded to the distributed search server at the time this display was generated. If the user were to select another range of 50 events, the distributed search server could retrieve these 50 events from one or more of the clients in real-time as discussed above in conjunction with FIGS. 4 and 5.

It will be understood that figures, and combinations of steps in the flowchart-like illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. These program instructions may be stored on a computer readable medium or machine readable medium, such as a computer readable storage medium.

Accordingly, the illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by modules such as special purpose hardware-based systems which perform the specified actions or steps, or combinations of special purpose hardware and computer instructions.

The above specification, examples, and data provide a complete description of the manufacture and use of the composition of the described embodiments. Since many embodiments can be made without departing from the spirit and scope of this description, the embodiments reside in the claims hereinafter appended.

The invention claimed is:

1. A method, comprising:
receiving a query for searching a set of field searchable events stored in a data store;
executing the query against the set of field searchable events to generate a subset of events;
identifying a field that exists in one or more events of the subset of events;
determining a number corresponding to how many unique values exist for the field among the subset of events;
causing concurrent display of (i) the number corresponding to how many unique values exist for the field along with a field name by which the field can be referenced in a query, and (ii) one or more other field names that each correspond to a field existing in one or more events in the subset of events and, for each other field name of the one or more other field names, an associated number corresponding of how many unique values exist for the corresponding field in the subset of events;
wherein the method is performed by one or more computing devices.

2. The method of claim 1, wherein each event in the set of field searchable events is associated with a timestamp.

3. The method of claim 1, wherein each event in the set of field searchable events includes machine data reflecting activity in an information technology environment.

4. The method of claim 1, wherein at least one event in the set of field searchable events includes log data reflecting activity in an information technology environment.

5. The method of claim 1, wherein at least one event in the set of field searchable events includes unstructured data.

6. The method of claim 1, wherein the query for searching the set of field searchable events includes a criterion for evaluating values for a field that exists in one or more events in the set of field searchable events.

7. The method of claim 1, wherein the query for searching the set of field searchable events includes a criterion requiring that matching events have a particular keyword.

8. The method of claim 1, wherein each of the events in the set of field searchable events is associated with a timestamp, and wherein the query for searching the set of field searchable events is associated with a time range into which matching events must fall.

9. The method of claim 1, further comprising:
causing display of information about one or more events that have the field and that are in the subset of events.

10. The method of claim 1, further comprising:
causing display of information about two or more events that have the field and that are in the subset events, wherein the two or more events that have the field are displayed in a sorted order corresponding to timestamps associated with the two or more events.

11. The method of claim 1, further comprising:
causing display of at least a second number corresponding to how many unique values exist among the subset of events for a second field that exists in one or more events of the subset of events.

12. The method of claim 1, wherein the display of the number corresponding to how many unique values exist for the field along with the field name is displayed in a field picker.

13. The method of claim 1, wherein the display of the number corresponding to how many unique values exist for the field along with the field name by which the field can be referenced in the query is displayed in a field picker.

14. The method of claim 1, wherein the display of the number corresponding to how many unique values exist for the field along with the field name by which the field can be referenced in the query is displayed in a field picker, and wherein the method further comprises:
causing display of information about one or more events in the subset of events;
receiving from a user a selection of a field name through the field picker;
hiding from the display at least one previously displayed event that does not contain the selected field.

15. The method of claim 1, wherein the display of the number corresponding to how many unique values exist for the field along with the field name by which the field can be referenced in the query is displayed in a field picker for specifying field criteria to further filter the subset of the events.

16. The method of claim 1, further comprising:
causing display of a histogram that indicates how many events in the subset of events are associated with a timestamp falling within each of a plurality of time ranges.

17. The method of claim 1, wherein causing display of the number corresponding to how many unique values exist for the field along with the field name by which the field can be referenced in the query causes display of the number and the field name in a vicinity of one or more other displayed numbers and their associated field names.

18. An apparatus, comprising:
a query receiver, implemented at least partially in hardware, that receives a query for searching a set of field searchable events stored in a data store;
a query executor, implemented at least partially in hardware, that executes the query against the set of field searchable events to generate a subset of events;
a field identifier, implemented at least partially in hardware, that identifying a field that exists in one or more events of the subset of events;
a subsystem, implemented at least partially in hardware, that determines a number corresponding to how many unique values exist for the field among the subset of events;
a subsystem, implemented at least partially in hardware, that causes concurrent display of (i) the number corresponding to how many unique values exist for the field along with a field name by which the field can be referenced in a query, and (ii) one or more other field names that each correspond to a field existing in one or more events in the subset of events and, for each other field name of the one or more other field names, an associated number corresponding of how many unique values exist for the corresponding field in the subset of events.

19. The apparatus of claim 18, wherein each event in the set of field searchable events is associated with a timestamp.

20. The apparatus of claim 18, wherein each event in the set of field searchable events includes at least one of: machine data reflecting activity in an information technology environment, log data reflecting activity in an information technology environment, or unstructured data.

21. The apparatus of claim 18, wherein the query for searching the set of field searchable events includes a criterion for evaluating values for a field that exists in one or more events in the set of field searchable events.

22. The apparatus of claim 18, wherein each of the events in the set of field searchable events is associated with a timestamp, and wherein the query for searching the set of field searchable events is associated with a time range into which matching events must fall.

23. The apparatus of claim 18, further comprising:
a subsystem, implemented at least partially in hardware, that causes display of information about two or more events that have the field and that are in the subset events, wherein the two or more events that have the field are displayed in a sorted order corresponding to timestamps associated with the two or more events.

24. One or more non-transitory computer-readable storage media, storing software instructions, which when executed by one or more processors cause performance of:
receiving a query for searching a set of field searchable events stored in a data store;
executing the query against the set of field searchable events to generate a subset of events;
identifying a field that exists in one or more events of the subset of events;
determining a number corresponding to how many unique values exist for the field among the subset of events;
causing concurrent display of (i) the number corresponding to how many unique values exist for the field along with a field name by which the field can be referenced in a query, and (ii) one or more other field names that each correspond to a field existing in one or more events in the subset of events and, for each other field name of the one or more other field names, an associated number corresponding of how many unique values exist for the corresponding field in the subset of events.

25. The one or more non-transitory computer-readable storage media of claim 24, wherein each event in the set of field searchable events is associated with a timestamp.

26. The one or more non-transitory computer-readable storage media of claim 24, wherein each event in the set of field searchable events includes at least one of: machine data reflecting activity in an information technology environment, log data reflecting activity in an information technology environment, or unstructured data.

27. The one or more non-transitory computer-readable storage media of claim 24, wherein the query for searching the set of field searchable events includes a criterion for evaluating values for a field that exists in one or more events in the set of field searchable events.

28. The one or more non-transitory computer-readable storage media of claim 24, wherein each of the events in the set of field searchable events is associated with a timestamp, and wherein the query for searching the set of field searchable events is associated with a time range into which matching events must fall.

29. The one or more non-transitory computer-readable storage media of claim 24, wherein the instructions, when executed by the one or more computing devices, further cause performance of:
causing display of information about two or more events that have the field and that are in the subset events, wherein the two or more events that have the field are displayed in a sorted order corresponding to timestamps associated with the two or more events.

30. The one or more non-transitory computer-readable storage media of claim 24, wherein the instructions, when executed by the one or more computing devices, further cause performance of:
causing display of at least a second number corresponding to how many unique values exist among the subset of events for a second field that exists in one or more events of the subset of events.

* * * * *